Oct. 24, 1950      C. O. RASMUSSEN      2,526,970
BEARING FOR VERTICAL HYDROEXTRACTORS
Filed Jan. 21, 1947
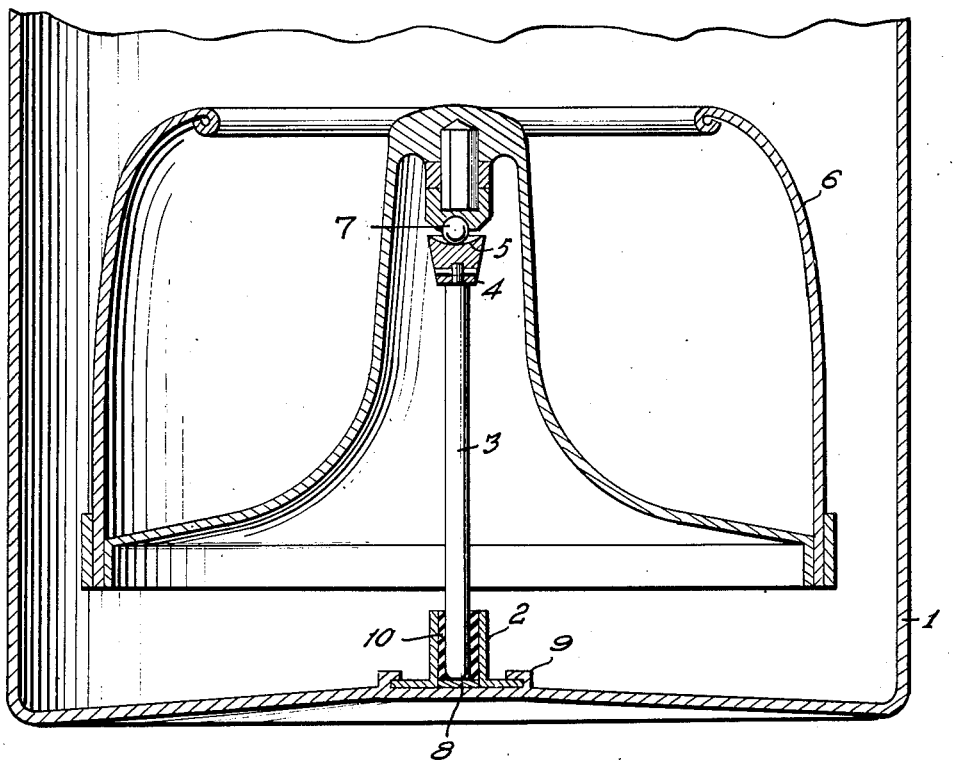
Inventor
Christian Oskar Rasmussen
By Glascock Downing Huth
                         Attorneys Patented Oct. 24, 1950

2,526,970

UNITED STATES PATENT OFFICE 2,526,970

BEARING FOR VERTICAL HYDRO-EXTRACTORS

Christian Oskar Rasmussen, Copenhagen, Denmark, assignor to Simplex, Copenhagen, Denmark, a Danish company Application January 21, 1947, Serial No. 723,262
In Denmark September 5, 1946

6 Claims. (Cl. 308—230)

The invention relates to a bearing for vertical hydro-extractors, which through a ball or tappet rest on a central pillar.

It is a wellknown fact that as a consequence of unsymmetrical mass-distribution of the matter to be dried in the hydro-extractor, considerable vibrations will be set up in the latter if no special measures are taken to obviate such vibrations.

The pillar has therefore, i. e., been made in such a way that its upper end may oscillate resiliently, either by making the pillar sufficiently resilient throughout or over part of its length, or by placing its lower end in a resilient bearing. The ball rests in a bearing in the pillar corresponding to its shape, so that the upper end of the pillar will closely follow the oscillations of the ball while the machine is running, and the oscillation strains will be taken up by the resilient parts of the pillar or its resilient bearing.

Another way in which endeavours have been made to overcome the vibrations of the hydro-extractor drum consists in the rigid pillar being provided with a broad bowl-shaped recess at top. Thereby the drum will be able to make small lateral oscillations, but this entails the danger that as a consequence of resonance phenomena it will move farther and farther to the side and finally drop off its bearing. Further, as a consequence of the rather considerable mass of the drum, the transmission of lateral strains from the drum to the pillar cannot be entirely obviated.

Now, according to the present invention it has proved possible to take up in a much more perfect manner the vibrations originating from the lateral oscillations of the ball, by a combination of technical features each well known per se, of letting the ball or pivot rest in a bowl-shaped recess in the top of the pillar which recess is of considerably larger horizontal extent than the ball or pivot, and by making the upper end of the pillar resilient to lateral stresses. In such case the ball or pivot will not during its circular movement on the supporting surface move farther and farther out on the latter, as would have been the case when the surface was stationary, but due to the resilience of the supporting surface, the lateral movements of the drum will be considerably dampened. By this reaction of the pillar on the drum a highly perfect dampening of the vibrations may be attained.

In order to ensure such dampening the bowl-shaped recess should, according to the invention be made in such a way that its radii of curvature are several times larger than the radius of the ball or the thickness of the pivot and preferably the recess may consist of a concave, spherical surface of a radius several times larger than the radius of the ball or the thickness of the pivot.

The drawing shows a vertical section through a hydro-extractor, the drum of which rests in a bearing made in accordance with the invention.

When the hydro-extractor drum 6, is filled with matter to be dried, for example washing, it is made to rotate at a great rate of revolutions by known means, e. g. by the use of a device on the turbine principle. Thereby the ball 7, will be made to move on a circular course on its supporting surface, due to the unsymmetrical load of the drum 6. The lateral oscillations thus made by the ball 7, during operation, will not be transmitted to the bearing 4, and the pillar 3, but on account of the friction between the ball 7, and the bearing 4, slight lateral stresses will be imparted to the latter by the ball. As, however, the pillar 3, is resiliently supported, the bearing 4, will to some extent make lateral oscillations in time with those of the ball 7, but of smaller magnitude and slightly delayed in relation to the lateral movements of the ball. On account of the resilient properties of the bearing 2, of the pillar 3, these lateral movements of the bearing 4, will not, or only to a slight extent, be transmitted to the casing 1.

On the other hand, the ball 7, will not make ever-increasing circular movements on the supporting surface, due to, e. g., resonance phenomena, because the bearing 4, will exert a highly dampening reaction on the lateral movements of the ball.

The spherical recess 5, the radius of which is many times greater than the radius of the ball, may therefore be made of rather limited width, without risk of the ball being flung out of the recess 5, during operation.

The lower end of the pillar 3 is mounted on a base, the latter being constructed of a hard, durable material, and consists of a plate 8, of tempered steel inserted into the bearing 2, from below, and the lower end of the pillar which is smoothly rounded, is also made of tempered steel. Further the bearing 2, is removable, being fitted in a bayonet socket 9.

The pillar may either in itself be resilient in the lateral direction or may be resiliently supported in such direction. In the latter case the lower end of the pillar may make small, lateral oscillations which are resiliently limited or taken up. In that case the pillar must rest on a very hard and durable material. According to the present invention an excellent support of the pillar is obtained by the use of a tempered steel plate on which the end of the pillar rests, said end of the pillar being smoothly rounded at bottom and preferably made of tempered steel. According to the present invention the said steel plate may easiest and most expediently be inserted from below into the bottom of the bearing.

The pillar is made removable in order that the container may be used for other purposes, such as washing. For the same reason it may be desirable also to remove the bearing, and according to the invention the latter may therefore be fastened in such a way as to be removable, preferably by means of a bayonet lock.

In the bottom of the casing 1, of the hydro-extractor, a bearing 2, is placed, in which a rigid pillar 3, is fastened with its lower end resting in an elastic rubber liner 10. The pillar carries at top a bearing 4, the bearing surface of which consists of a concave, spherical recess 5. In the recess rests a ball 7, turnably resting in the hydro-extractor drum 6, which ball forms the sole support of the hydro-extractor drum.

Having now described my invention what I claim as new and desire to secure by Letters Patent is:

1. A bearing for vertical hydro-extractors including in combination a drum, a ball carried thereby, a central pillar, a bowl-shaped recess provided at the top of the pillar and having a considerably greater horizontal extent than the ball for receiving the ball, and the pillar being resilient to lateral stresses so that the pillar by reaction on the drum may exert a considerable dampening of the vibrations.

2. A bearing as claimed in claim 1 in which each of the radii of curvature of the bowl-shaped recess are several times larger than the radius of the ball.

3. A bearing as claimed in claim 1 in which the bowl-shaped recess consists of a concave, spherical surface of a radius several times larger than the radius of the ball.

4. A bearing as claimed in claim 1 in which means is provided for mounting the lower end of the pillar and allowing slight lateral oscillations of the lower end of the pillar which oscillations are absorbed resiliently, said means comprising a tempered steel plate on which the lower end of the pillar rests, the lower end of the pillar being smoothly rounded at the bottom and also made of tempered steel.

5. An arrangement as claimed in claim 1 in which an upright tubular bearing sleeve is detachably mounted for receiving the lower end of the pillar, a steel plate mounted in the lower end of the tubular bearing for supporting the lower end of the pillar, and resilient means within the tubular bearing surrounding and contacting the lower portion of the pillar.

6. An arrangement as claimed in claim 5 in which a bayonet lock is provided for detachably connecting the bearing sleeve to the bottom of a container.

CHRISTIAN OSKAR RASMUSSEN.

REFERENCES CITED

The following references are of record in the file of this patent:

UNITED STATES PATENTS

| Number | Name | Date |
|---|---|---|
| 456,654 | Jeppesen | July 28, 1891 |
| 1,788,445 | Weinbrenner | Jan. 13, 1931 |

FOREIGN PATENTS

| Number | Country | Date |
|---|---|---|
| 70,090 | Switzerland | Nov. 16, 1944 |